Patented Nov. 24, 1936

2,062,171

UNITED STATES PATENT OFFICE 2,062,171

PRODUCTION OF CRYSTALLINE PRODUCTS BY CONDENSING UREA AND FORMALDEHYDE

Nathaniel Fuchs, Linden, N. J., assignor, by mesne assignments, to Plaskon Company, Incorporated, a corporation of Delaware No Drawing. Application November 7, 1932, Serial No. 641,691

8 Claims. (Cl. 260—3)

It has originally been suggested in U. S. P. No. 1,355,834 to John to condense urea and formaldehyde in the absence of condensing agents for the purpose of obtaining commercially usable condensation products. Furthermore, in U. S. P. No. 1,458,453 to Pollak it has been disclosed that final products having the transparency of rock crystal and being entirely free from bubbles, are obtained by reacting formaldehyde on urea in proportions of less than three molecules of formaldehyde to one molecule of urea in the presence of a base or a substance possessing basic properties. According to U. S. P. No. 1,687,312 to Ripper the same products having the transparency of rock crystal are obtained if the pH value during the condensing reaction is adjusted as follows: In the first stage of the process the pH value does not exceed 7 and in the second stage of the condensation reaction the pH value is adjusted within a range of 7 to 3. According to these processes initial products are obtainable which are further condensed to form the final transparent products.

The present invention relates to the production of crystalline products which are to be used as molding material by condensing urea or a mixture of urea and thiourea with formaldehyde.

I have found that these crystalline products are obtainable if the condensation of urea or urea and thiourea with formaldehyde is kept within a pH range of about 5.5 to 7. To keep it within this pH range, I prefer to use nitrites, such as, for instance, alkali metal nitrites, and nitrites of the alkaline earth metal group.

The action of these nitrites will be evident from the following:

When condensing urea or a mixture of urea and thiourea with formaldehyde without the use of any condensing agent, the reaction proceeds very rapidly due to the formic acid contained in the formaldehyde or which may be formed in the formaldehyde during the condensation reaction. This formic acid acts as a condensing agent and the condensation reaction is hastened to a great extent, that is to say, the condensation proceeds too much on the acid side, whereby an overcondensed product is obtained which is unsuitable for use as a molding material. In such case the condensation reaction proceeds at such a rate that it is no longer controllable. If, however, a small amount of nitrite, say about 0.1 to 1 part, calculated on the weight of the urea compound used, is added, the nitrite reacts with the formic acid and, consequently, prevents the condensation reaction from going too far into the acid side and, therefore, from proceeding too rapidly. By the regulation of heat and by the addition of certain amounts of nitrite which must be determined according to the heat applied, the condensation reaction is very easily kept within a pH range of about 5.5 to 7. The formic acid contained in the commercial formaldehyde or which develops during the condensation reaction when starting with neutralized formaldehyde reacts upon the nitrite and forms metal formate and nitrous acid. The nitrous acid, thus formed, immediately reacts upon the urea and forms carbon dioxide, nitrogen and water, so that all undesirable contamination products are converted into a gaseous form and thus eliminated from reacting in the further course of the condensation reaction.

My process may be carried out advantageously in the following manner. However, the process is not restricted to the use of this specific method:

The urea and formaldehyde are used in the proportions of about one molecule of urea to about 1.5 molecules of formaldehyde. The formaldehyde used is generally a 40% formaldehyde solution by volume, or 37% by weight. However, formaldehyde solutions of other concentrations may also be used. I prefer to first neutralize the formaldehyde at room temperature to a pH of about 7.2. The neutralized formaldehyde solution is then heated to about 55° C. The heating brings about a slight decrease in the pH value to about 6.9. This neutralization is effected in order to have an almost completely neutral solution before adding the urea to this mixture. However, it is not necessary to neutralize the formaldehyde solution before starting the reaction.

The purpose of heating the formaldehyde solution is to increase the solubility of the urea therein. After the formaldehyde has been heated to 55° C., the urea or the mixture of urea and thiourea is added. The urea is almost immediately dissolved. However, after dissolving the urea, the temperature drops to about 35° C. Thereafter a predetermined amount of nitrite, say about 0.1 to 1 part, calculated on the weight of the urea substance used, is added. When using a formaldehyde solution which has not been previously neutralized, an extra amount of nitrite equivalent to the original formic acid content of the formaldehyde is added. The solution is then heated to a temperature of about 75° C. Following this procedure the temperature rises by itself to about 95° C. The temperature is kept at this point until the solution turns cloudy, whereupon the condensation proceeds further for a certain length of time. The length of time from the first reached temperature of about 95° C. to the point where the solution becomes cloudy depends on the amount of nitrite used in the condensation. The more nitrite is used, the longer it takes for the cloudiness to appear, so that according to the amount of nitrite used in the course of reaction, it is possible to control the rate of the reaction. By using a lower temperature and the same amount of nitrite, a similar condensation occurs, but at a slower rate. In this case the mixture is heated to about 65° C. At that point the temperature rises by itself very rapidly, but is stopped at 80° C. by external cooling. The time elapsed between the time when 80° C. are first reached until the mixture becomes cloudy depends on the amount of nitrite used in the condensation process. After stopping the condensation reaction, the condensation mixture is cooled off whereby crystalline products are precipitated. After filtering and drying the reaction mixture, the remaining crystalline mass may be ground to a powder which is used per se for molding purposes, or may be mixed in this state with fillers and then used for molding. However, I prefer to mix the hot condensation reaction mixture in a mixing vessel with a filler, for instance, with cellulose fluff and the mixture thus prepared may be dried, whereby the condensation product precipitates in and on the filler. After drying, this product is ground to a powder and this powder is used for molding purposes.

As cellulose fluff I prefer to use such of alpha cellulose.

The drying process may be carried out while applying vacuum.

The following examples will further illustrate the present invention:

*Example 1.*—792 cc. of commercial formaldehyde, 40% by volume, are carefully neutralized at room temperature to a pH of 7.1 and heated up to about 55° C. The pH value drops at that temperature to a pH of about 7.0. After the formaldehyde has been heated to about 55° C., 420 grams of urea are added. Following this addition of urea, the temperature drops to about 35° C. To this mixture are admixed 25 cc. of a 10% solution of sodium nitrite. It is not necessary to add the sodium nitrite in a 10% solution, but the equivalent amount of sodium nitrite may also be added in a solid state or solution of any reasonable concentration. Upon the addition of sodium nitrite, the mixture is heated up to about 75° C. From this point the temperature rises by itself to about 96° C. and is kept at this point for awhile. 19 minutes after the mixture has first reached 96° C. the mixture begins to turn cloudy. This cloudy mixture is further heated at the same temperature for about 15 minutes after the cloudiness first appears. During the condensation reaction the pH value proceeds within a range of 6.0 to 6.5. After that the reaction is stopped and the condensation liquid is admixed with 378 grams of cellulose fluff. For the purpose of obtaining a more uniform condensation product, it may be advisable to agitate the reaction mixture during the whole reaction period. The moist mixture of urea formaldehyde condensation product is then dried at a temperature of about 70° to 110° C. until the total content of water is equal to from 3 to 9%. The dried material is then ground to a powder in a ball mill, after which treatment the powder is suitable for molding purposes.

*Example 2.*—792 cc. of commercial formaldehyde, 40% by volume, are neutralized at room temperature to a pH of 7.2 and heated up to about 55° C. The pH value drops at that temperature to a pH of about 7.0. After the formaldehyde has been heated to about 55° C., 420 grams of urea are added. After this addition the temperature drops to about 35° C. To this mixture are further admixed 10 cc. of a 10% solution of potassium nitrite. After the addition of potassium nitrite the mixture is heated to about 80° C. From this point the temperature rises by itself to about 96° C. and is kept at this point for awhile. 6 minutes after the mixture has first reached 96° C., the mixture begins to turn cloudy. This mixture is maintained at the same temperature for about 20 minutes after the cloudiness first appears. Thereafter the reaction is stopped and the condensation liquid is admixed immediately with 378 grams of cellulose fluff and then dried and ground as described in Example 1.

*Example 3.*—A mixture of 792 cc. of commercial formaldehyde, 40% by volume, and 420 grams of urea and 10 cc. of sodium nitrite prepared according to Example 2 is heated up to 65° C. From this point the temperature rises by itself very rapidly, but is stopped at 80° C. by external cooling. The temperature of 80° C. is kept for awhile. 23 minutes after the mixture has reached 80° C. the mixture begins to turn cloudy. This cloudy mixture is maintained at the same temperature for about 25 minutes after the cloudiness first appears. Thereafter the reaction is stopped and the condensation liquid is admixed with 378 grams of cellulose fluff and then dried and ground as described in Example 1.

*Example 4.*—A mixture of 792 cc. of commercial formaldehyde, 40% by volume, and 420 grams of urea of 10 cc. of sodium nitrite prepared according to Example 2 is heated up to about 60° C. From this point the temperature rises very rapidly, but is kept at a temperature of 76° C. by cooling. 36 minutes after the mixture has first reached 76° C., the mixture begins to turn cloudy. This cloudy mixture is maintained at the same temperature for about 15 minutes after the cloudiness first appears. Thereafter the reaction is stopped and the condensation liquid is admixed with 378 grams of cellulose fluff and then dried and ground.

*Example 5.*—792 cc. of commercial formaldehyde, 40% by volume, are carefully neutralized at room temperature to a pH of 7.2 and heated up to 55° C. The pH value drops at that temperature to a pH of 7.0. At this point 420 grams of urea are admixed. After this addition of urea, the temperature drops to about 35° C. To this mixture are admixed 33.6 cc. of a 10% solution of sodium nitrite. After the addition of sodium nitrite the mixture is heated to 80° C. The temperature does not rise sufficiently by itself, therefore heat must be applied until a temperature of 96° C. is reached. 25 minutes after the mixture has first reached 96° C. the mixture begins to turn cloudy. This cloudy mixture is then maintained at the same temperature for 25 minutes. Thereafter the reaction is stopped and the condensation liquid is admixed with 378 grams of cellulose fluff and then dried and ground.

*Example 6.*—792 cc. of commercial formaldehyde, 40% by volume, are neutralized at room temperature to a pH of 7.2 and heated up to about 55° C. The pH value drops at that temperature to a pH of 7.0. After the formaldehyde has been heated to about 55° C., 420 grams of urea are added. After this addition, the temperature drops to about 35° C. To this mixture are further admixed 3 grams of barium nitrate. After the addition of barium nitrite the mixture is heated to about 80° C. From this point the temperature rises by itself to 96° C. and is kept at this point for a while. 9 minutes after the mixture has first reached 96° C. the mixture begins to turn cloudy. This mixture is heated for about 18 minutes more at the same temperature. Thereafter the reaction is stopped and the condensation liquid is admixed immediately with 378 grams of cellulose fluff and then dried and ground according to Example 1.

Example 7.—792 cc. of commercial formaldehyde, 40% by volume, are neutralized at room temperature to a pH of 7.2 and heated up to about 55° C. The pH drops at that temperature to a pH of about 7.0. After the formaldehyde has been heated to about 55° C., 420 grams of urea are added. After this addition, the temperature drops to about 35° C. To this mixture are further admixed 2 grams of calcium nitrite. After the addition of calcium nitrite the mixture is heated to about 65° C. From this point the temperature rises by itself to about 80° C. and is kept at this point for a while. 24 minutes after the mixture has first reached 80° C. the mixture begins to turn cloudy. This mixture is then heated for about 25 minutes more at the same temperature. Thereafter the reaction is stopped and the condensation liquid is admixed immediately with 378 grams of cellulose fluff and then dried and ground according to Example 1.

Example 8.—792 cc. of commercial formaldehyde, 40% by volume, showing a pH of 3.2 are heated to about 55° C. After the formaldehyde has been heated to about 55° C., 420 grams of urea are added. After this addition of urea the temperature drops to about 35° C. To this mixture are further admixed 30 cc. of a 10% solution of sodium nitrite. After that the mixture is heated to about 60° C., at which temperature the pH is about 5.2 to 5.6. From this point the temperature is brought to 80° C. at which point it turns cloudy. This mixture is further heated for about 15 minutes from the clouding point at the same temperature. Thereafter the reaction is stopped and the condensation liquid is admixed immediately with 378 grams of cellulose fluff and then dried and ground, according to Example 1.

Example 9.—450 cc. of commercial formaldehyde, 40% by volume, are neutralized at room temperature to a pH of about 7.2 and heated up to about 55° C. The pH value drops to about 7.0. Then 10 cc. of a 10% solution of sodium nitrite are added followed by an addition of 150 grams of urea and 114 grams of thiourea. After this addition the temperature drops to about 35° C. The mixture is then heated to about 55° C. From this point the temperature rises by itself to about 75° C. and is kept at 75° C. for a while. The pH value of the mixture after reaching 75° C. remains at about 5.8. 35 minutes after the mixture has first reached 75° C. the solution begins to turn cloudy. The cloudy mixture is further heated for 15 minutes more at the same temperature. Then the condensation liquid is admixed with 215 grams of cellulose fluff.

In the above example the ratio of urea and thiourea can be varied within wide limits.

In case thiourea alone is condensed with formaldehyde in the presence of a nitrite resin is formed which is soft and which, when mixed with cellulose fluff, yields a molding powder which does not set solid when molded in the press. However, a small addition of urea, say about 20% to the thiourea produces a resin which, when mixed with cellulose fluff, shows satisfactory results for molding purposes.

I claim:
1. A process for the preparation of condensation products, which comprises heating a urea substance selected from the group consisting of urea and a mixture of urea and thiourea with formaldehyde in an aqueous medium in the presence of a small amount of a nitrite of the group consisting of alkali metal nitrites and alkaline earth metal nitrites.

2. A process for the preparation of condensation products, which comprises heating a urea substance selected from the group consisting of urea and a mixture of urea and thiourea with formaldehyde in a proportion of approximately one mol. of the urea substance to 1.5 mol. of formaldehyde in an aqueous medium in the presence of a small amount of a nitrite of the group consisting of alkali metal nitrites and alkaline earth metal nitrites.

3. A process for the preparation of condensation products, which comprises heating to a temperature of about 60° C. to about 100° C. a urea substance selected from the group consisting of urea and a mixture of urea and thiourea with formaldehyde in a proportion of approximately one mol. of the urea substance to 1.5 mol. of formaldehyde in an aqueous medium in the presence of a small amount of a nitrite of the group consisting of alkali metal nitrites and alkaline earth metal nitrites.

4. A process for the preparation of condensation products which comprises heating to a temperature of about 60° C. to about 100° C. for about ¼ of an hour to about 2 hours a urea substance selected from the group consisting of urea and a mixture of urea and thiourea with formaldehyde in a proportion of approximately one mol. of the urea substance to 1.5 mol. of formaldehyde in an aqueous medium in the presence of a small amount of a nitrite of the group consisting of alkali metal nitrites and alkaline earth metal nitrites.

5. A process for the production of condensation products, which comprises heating to a temperature of about 60° C. to about 100° C. for about ¼ of an hour to about 2 hours a urea substance selected from the group consisting of urea and a mixture of urea and thiourea with formaldehyde in a proportion of approximately one mol. of the urea substance to 1.5 mol. of formaldehyde in an aqueous medium in the presence of an amount of about 0.1 part to about 1 part of a nitrite selected from the group consisting of alkali metal nitrites and alkaline earth metal nitrites, calculated on the weight of the urea substance used.

6. A process for the production of condensation products, which comprises heating to a temperature of about 60° C. to about 100° C. for about ¼ of an hour to about 2 hours a urea substance selected from the group consisting of urea and a mixture of urea and thiourea with neutral formaldehyde, 40% by volume, in a proportion of approximately one mol. of the urea substance to 1.5 mol. of formaldehyde in the presence of about 0.5% sodium nitrite, calculated on the weight of the urea substance used.

7. A process for the production of condensation products, which comprises heating to a temperature of about 60° C. to about 100° C. for about ¼ of an hour to about 2 hours a urea substance selected from the group consisting of urea and a mixture of urea and formaldehyde with neutral formaldehyde, 40% by volume, in a proportion of approximately one mol. of the urea substance to 1.5 mol. of formaldehyde in the presence of 0.25% potassium nitrite, calculated on the weight of the urea substance used.

8. A process for the production of condensation products which comprises heating to a temperature of about 60° C. to about 100° C. for about ¼ of an hour to about 2 hours a urea substance selected from the group consisting of urea and a mixture of urea and thiourea with neutral formaldehyde, 40% by volume, in a proportion of approximately one mol. of the urea substance to 1.5 mol. of formaldehyde in an aqueous medium in the presence of 0.5% calcium nitrite, calculated on the weight of the urea substance used.

NATHANIEL FUCHS.